United States Patent
Young et al.

(10) Patent No.: US 6,870,993 B2
(45) Date of Patent: Mar. 22, 2005

(54) INTERCONNECT INCLUDING A REPEATER FOR AN OPTICAL TRANSMISSION CABLE

(75) Inventors: Mark K. Young, Monmouth Junction, NJ (US); David S. DeVincentis, Flanders, NJ (US)

(73) Assignee: Red Sky Systems, Inc., South Plainfield, NJ (US)

( * ) Notice: Subject to any disclaimer, the term of this patent is extended or adjusted under 35 U.S.C. 154(b) by 0 days.

(21) Appl. No.: 10/693,614

(22) Filed: Oct. 24, 2003

(65) Prior Publication Data

US 2005/0036751 A1 Feb. 17, 2005

Related U.S. Application Data

(60) Provisional application No. 60/433,191, filed on Dec. 13, 2002.

(51) Int. Cl.$^7$ ................................................. G02B 6/44
(52) U.S. Cl. ....................................................... 385/100
(58) Field of Search ................................ 385/100–114; 439/76.1, 79

(56) References Cited

U.S. PATENT DOCUMENTS

| | | | | |
|---|---|---|---|---|
| 4,278,835 A | * | 7/1981 | Jackson | .................... 174/70 R |
| 4,784,462 A | * | 11/1988 | Priaroggia | ................... 385/110 |
| 6,424,761 B1 | * | 7/2002 | Kordahi et al. | ............... 385/25 |
| 6,647,187 B2 | * | 11/2003 | Consonni et al. | ........... 385/113 |

* cited by examiner

Primary Examiner—Khiem Nguyen
(74) Attorney, Agent, or Firm—Mayer Fortkort & Williams, PC; Stuart H. Mayer, Esq.

(57) ABSTRACT

An optical amplifier module contains at least one optical amplifier. The module includes an internal housing having an outer dimension substantially equal to an outer dimension of an internal fiber splice housing of an undersea optical fiber cable joint. The internal housing includes a pair of opposing end faces each having a retaining element for retaining the internal housing within an outer housing of the undersea optical fiber cable joint. The internal housing also includes a sidewall interconnecting the opposing end faces, which extends between the opposing end faces in a longitudinal direction. The sidewall includes a receptacle portion having a plurality of thru-holes each being sized to receive a passive optical component employed in an optical amplifier.

35 Claims, 6 Drawing Sheets

INTERCONNECT INCLUDING A REPEATER FOR AN OPTICAL TRANSMISSION CABLE

STATEMENT OF RELATED APPLICATIONS

This application claims the benefit of priority to U.S. Provisional Patent Application 60/433,191, filed Dec. 13, 2002, entitled "Repeater Housing Packaging Having Multiple Cable Joints." This application is also related to copending U.S. patent application Ser. No. 10/687,547, filed on even date herewith, and entitled "Optical Amplifier Module Housed in a Universal Cable Joint For An Undersea Optical Transmission System", the contents of which are incorporated by reference in their entirety.

FIELD OF THE INVENTION

The present invention relates to the field of optical repeaters, and more particularly to an optical repeater employed in an undersea optical transmission system.

BACKGROUND OF THE INVENTION

In undersea optical transmission systems optical signals that are transmitted through an optical fiber cable become attenuated over the length of the cable, which may span thousands of miles. To compensate for this signal attenuation, optical repeaters are strategically positioned along the length of the cable.

In a typical optical repeater, the optical fiber cable carrying the optical signal enters the repeater and is coupled through at least one amplifier and various components, such as optical couplers and decouplers, before exiting the repeater. These optical components are coupled to one another via optical fibers. Repeaters are housed in a sealed structure that protects the repeaters from environmental damage. During the process of deployment, the optical fiber cable is coiled onto large drums located on a ship. Consequently, the repeaters become wrapped about the drums along with the cable. Due to the nature of the signals, and the ever increasing amount of information being transmitted in the optical fibers, repeaters are getting larger, and their increased length creates problems as they are coiled around a drum. Although the drums may be up to 9–12 feet in diameter, current repeaters may be greater than 5 feet in length, and, therefore, are not able to lie flat, or even substantially flat, along a drum. Tremendous stresses due to forces on the order of up to 100,000 pounds are encountered at the connection point between the repeater and the fiber optic cable to which it is attached, especially during paying out and reeling in of the cable. The non equi-axial loading across the cable may arise as a result of severe local bending that is imposed on the cable at its termination with the repeater. This loading would inevitably lead to failure of cable components at loads well below the tensile strength of the cable itself.

To prevent failure of the cable during deployment of the repeater, a bend limiter is often provided, whose purpose is to equalize the forces imposed on the cable. In addition, a gimbal may be provided at each longitudinal end of the repeater to which the bend limiting devices are attached. The gimbal provides free angular movement in two directions. The bend angle allowed by the gimbal between the repeater and bend limiting device further reduces the local bending that is imposed on the optical fiber cables.

The large physical size of conventional repeaters increases their complexity and cost while creating difficulties in their deployment.

SUMMARY OF THE INVENTION

In accordance with the present invention, an optical transmission cable interconnect for insertion in an undersea optical transmission cable includes a plurality of modules. Each of the modules includes an internal housing having an outer dimension substantially equal to an outer dimension of an internal fiber splice housing of an undersea optical fiber cable joint. The internal housing includes a pair of opposing end faces each having a retaining element for retaining the internal housing within an outer housing of the undersea optical fiber cable joint. The retaining element includes an aperture through which at least one optical fiber extending from an end portion of the optical transmission cable extends into the internal housing. A sidewall interconnects the opposing end faces and extends between the opposing end faces in a longitudinal direction. The sidewall includes a receptacle portion having a plurality of thru-holes each being sized to receive a passive optical component employed in an optical amplifier. A first segment of undersea optical transmission cable operationally couples a first end face of a first of the modules to a second end face of a second of the modules.

In accordance with one aspect of the invention, a plurality of undersea optical transmission cable pigtails are operationally coupled to a second end face of the first module and a first end face of the second module, respectively.

In accordance with another aspect of the invention, at least one of said modules contains at least one optical amplifier.

In accordance with another aspect of the invention, the first of the modules contains optical components of the optical amplifier and a second of the modules contains electronic components of the optical amplifier.

In accordance with another aspect of the invention, the first of the modules contains a subset of components required of the optical amplifier and a second of the modules contains the remaining components of the optical amplifier.

In accordance with another aspect of the invention, the interconnect includes a plurality of undersea optical fiber cable joints and a plurality of undersea optical transmission cable pigtails. The cable pigtails operationally couple a first of the cable joints to a second end face of the first module and a second of the cable joints to a first end face of the second module, respectively.

In accordance with one aspect of the invention, the plurality of thru-holes laterally extend through the receptacle portion of the sidewall in the longitudinal direction.

In accordance with another aspect of the invention, the internal housing has a generally cylindrical shape. The receptacle portion of the sidewall has a curvature that defines a diameter of the cylindrical shape.

In accordance with another aspect of the invention, the undersea optical fiber cable joint is a universal joint for jointing optical cables having different configurations.

In accordance with another aspect of the invention, the universal joint includes a pair of cable termination units in which end portions of the optical cables to be jointed are respectively retained. The retaining elements are each connectable to one of the cable termination units.

In accordance with another aspect of the invention, the retaining elements each include a flange through which at least one optical fiber extending from the end portion of one of the optical cables extends into the internal housing.

In accordance with another aspect of the invention an optical fiber storage area is located within the internal housing.

In accordance with another aspect of the invention, a support member is provided for supporting at least one circuit board on which reside electronics associated with the optical amplifier.

In accordance with another aspect of the invention, the optical fiber storage area includes at least one optical fiber spool around which optical fiber can be wound.

In accordance with another aspect of the invention, the internal housing is formed from a pair of half units each having a mating surface extending in a longitudinal plane that includes the longitudinal direction. The half units are interconnected to one another along the mating surfaces.

In accordance with another aspect of the invention, the support member supporting the circuit board is arranged so that the circuit board and the mating surface form a substantially continuous plane.

In accordance with another aspect of the invention, the support member is defined by a lip extending inwardly from, and recessed below, the mating surface.

In accordance with another aspect of the invention, the sidewall includes a pair of ribbed members extending longitudinally from the receptacle portion of the sidewall. The ribbed members each have a tension rod thru-hole extending laterally therethrough in the longitudinal direction for supporting a tension rod employed by the undersea optical fiber cable joint.

In accordance with another aspect of the invention, the outer dimension of the internal housing is less than about 15 cm×50 cm.

In accordance with another aspect of the invention, the outer dimension of the internal housing is about 7.5 cm×15 cm.

DETAILED DESCRIPTION

The present inventors have recognized that a substantially smaller repeater can be achieved by first reducing the length of the repeater so that the stresses placed upon it during its deployment are greatly reduced, thereby eliminating the need for gimbals. The elimination of the gimbals, in turn, allows further reductions in the dimensions of the repeaters.

The present inventors have further recognized that a repeater substantially reduced in size can be housed in a unit formed from off-the-shelf components that have been qualified for the undersea environment. In particular, the inventors have recognized that a housing conventionally used for interconnecting different undersea optical fiber cables can also be used as an ultra-small form-factor repeater housing. As discussed below, one such housing, commonly referred to as the Universal Joint, has become the defacto worldwide standard for maintaining submarine cables and has a lengthy history of successful deployment. The present invention thus provides a repeater that, because of its small size, is easily deployed and which is located in an economical, submarine qualified housing that is already well established in the undersea optical communications industry. Moreover, because the Universal Joint can interconnect different optical fiber cables, the repeater can be used to interface with a variety of cables and systems from different manufacturers.

Figure 1:
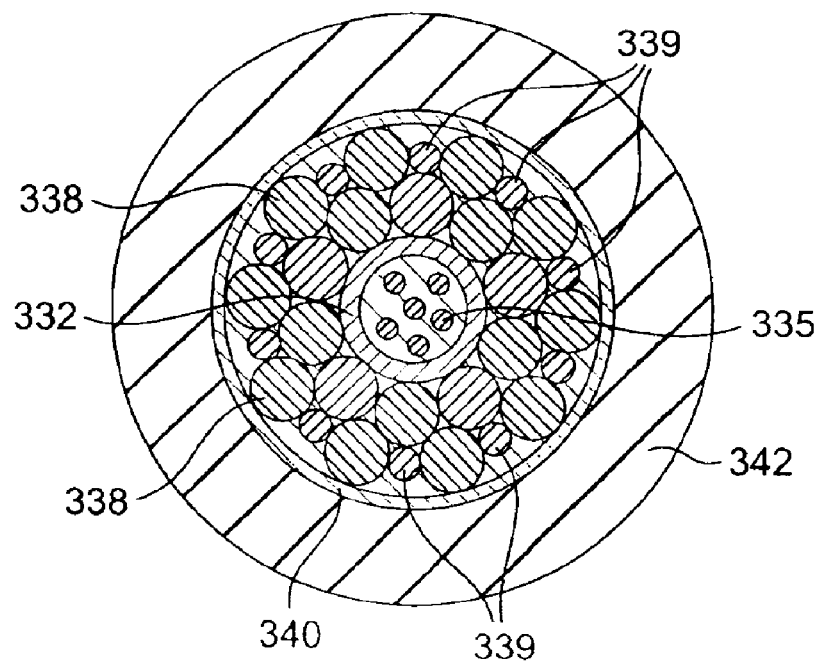
FIG. 1 shows an example of an undersea optical fiber cable.

To facilitate an understanding of the present invention, an example of an undersea optical fiber cable will be described in connection with FIG. 1. While different cable manufactures employ cables having different configurations and dimensions, most cables employ most of the components depicted in FIG. 1 in one form or the other. Optical cable 330 comprises a single, centrally located gel-filled buffer tube 332 made from a metal such as aluminum or stainless steel. The gel-filled buffer tube 332 contains optical fibers 335. In some cases the buffer tube 332 is replaced with a centrally disposed kingwire that is surrounded by optical fibers that are embedded in a polymer. Two layers of strandwires, which serve as strength members, are wound around the buffer tube. One layer includes strandwires 338 and the other layer includes strandwires 339. A copper conductor 340 surrounds the strandwires and serves as both an electrical conductor and a hermetic barrier. An outer jacket 342 formed from polyethylene encapsulates the copper conductor 340 and serves as an insulating layer.

Figure 2:
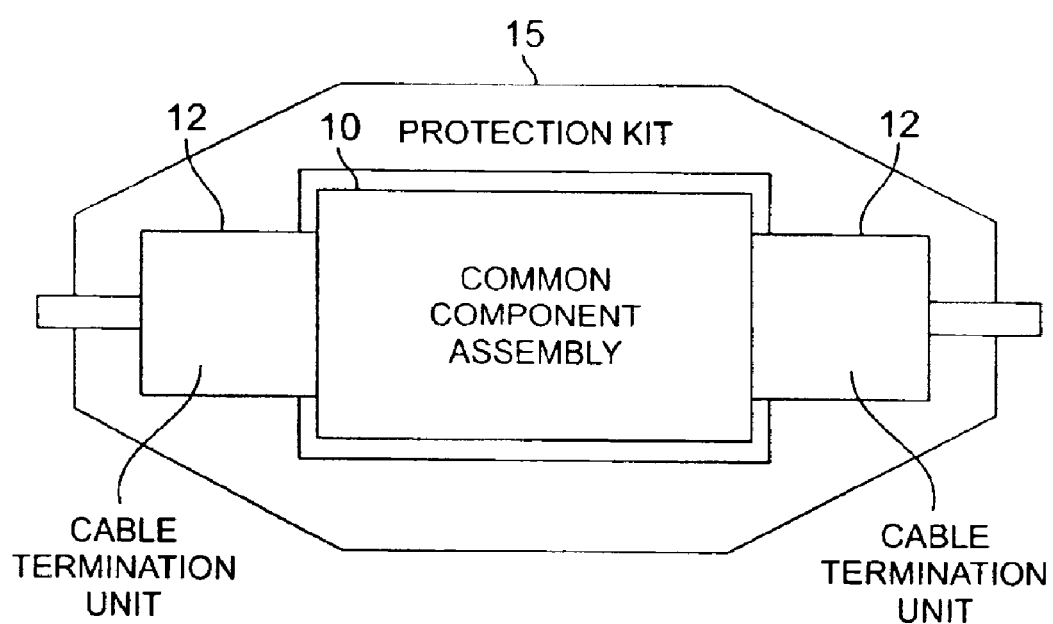
FIG. 2 shows a simplified schematic diagram of a universal cable joint for jointing fiber optic cables for use in undersea optical telecommunication systems.

FIG. 2 shows a simplified schematic diagram of a universal cable joint for jointing fiber optic cables for use in undersea optical telecommunication systems. Such a joint is referred to as a universal cable joint because it can interconnect many different types of undersea optical telecommunication cables, regardless of manufacturer. The cable joint includes a common component assembly 10 in which an optical fiber splice is located. The fiber splice is formed from two fibers that respectively originate in two cables that each terminate in cable termination units 12. A protective assembly 15 surrounds common component assembly 10 and cable termination units 12 to provide protection from the external environment.

Figure 3:
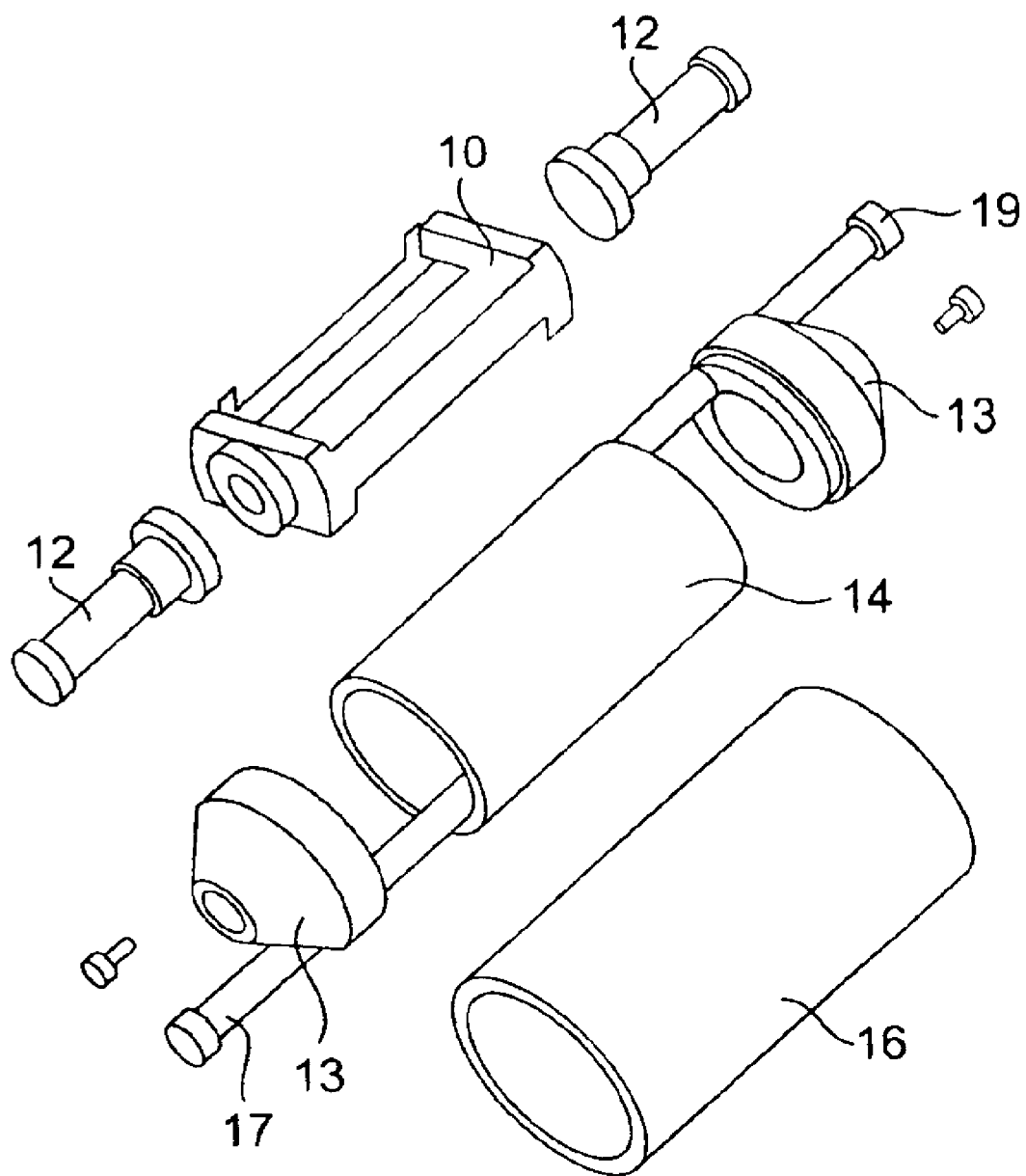
FIG. 3 shows a particular example of a universal cable joint that is available from Global Marine Systems Limited and the Universal Joint Consortium.

FIG. 3 shows a particular example of a universal cable joint that is available from Global Marine Systems Limited and the Universal Joint Consortium, which, as previously mentioned, is often simply referred to as the Universal Joint. In FIGS. 2 and 3, as well as the figures that follow, like reference numerals indicate like elements. In FIG. 3, the protective assembly 15 depicted in FIG. 2 comprises a stainless steel sleeve 14 that surrounds the common component assembly 10 and a polyethylene sleeve 16 that is molded over the common component assembly 10. The stainless steel sleeve 14 provides resistance to tensile, torsional and compressive loads and further provides an electrically conductive path through which electrical power can be transmitted from the copper conductor of one cable to the copper conductor of the other.

The jointing process begins by stripping back the various layers of the cable to reveal predetermined lengths of the outer jacket, copper conductor, strandwires, and the fiber package (e.g., the buffer tube containing the optical fibers or the kingwire surrounded by the optical fibers). The strandwires are clamped in a ferrule assembly located in the cable termination units 12. The fiber package extends into the common component assembly 10, where it is held in place by a series of clamps. In the common component assembly 10 the individual fibers are separated and spliced to their corresponding fibers from the other cable. The splices, along with excess fiber, are looped and wound in channels that are formed within the common component assembly 10. The common component assembly 10 is inserted in the stainless steel sleeve 14 and end caps 13 are screwed to each end of the assembly 10. Two tension rods 17 and 19 extend through the end caps 13 and the common component assembly 10. The tension rods 17 and 19 are designed to carry the tension loads that are placed on the universal joint during the deployment process as the joint is transferred from a ship to its undersea environment. Finally, the joint is laid in a mold that is injected with molten polyethylene to provide an insulate (i.e., polyethylene sleeve 16) that is continuous with the outer jacket of the cables.

Figure 4:
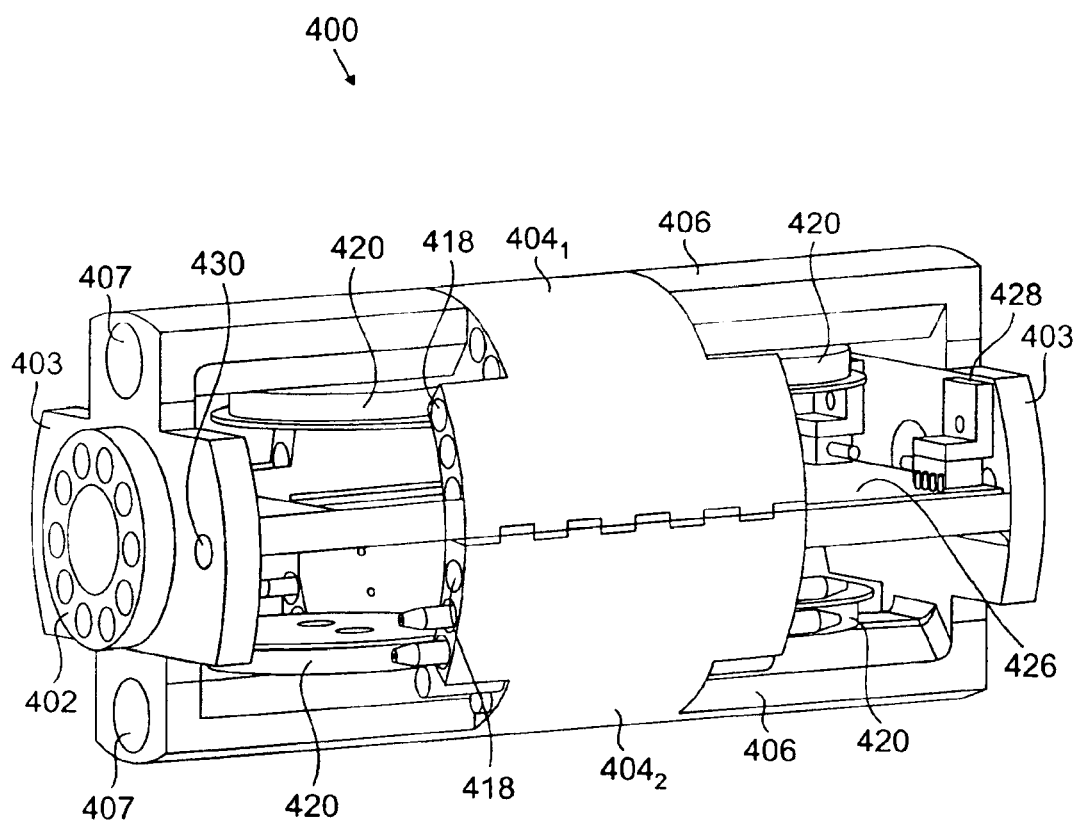
FIG. 4 shows a perspective view of optical amplifier module constructed in accordance with the present invention.
Figure 5:
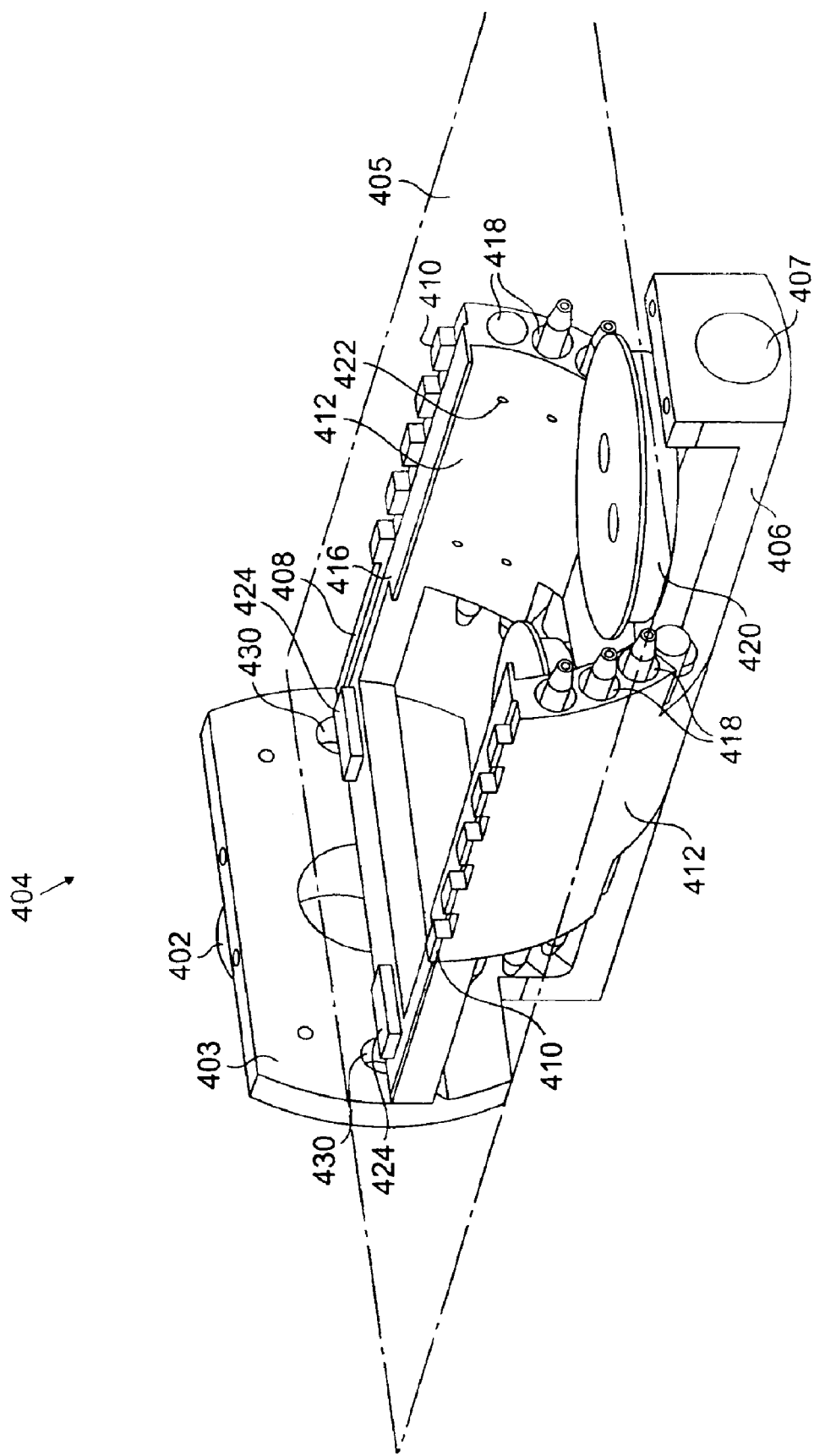
FIGS. 5 and 6 show different perspective views of one of the half units that form the optical amplifier module depicted in FIG. 4.
Figure 6:
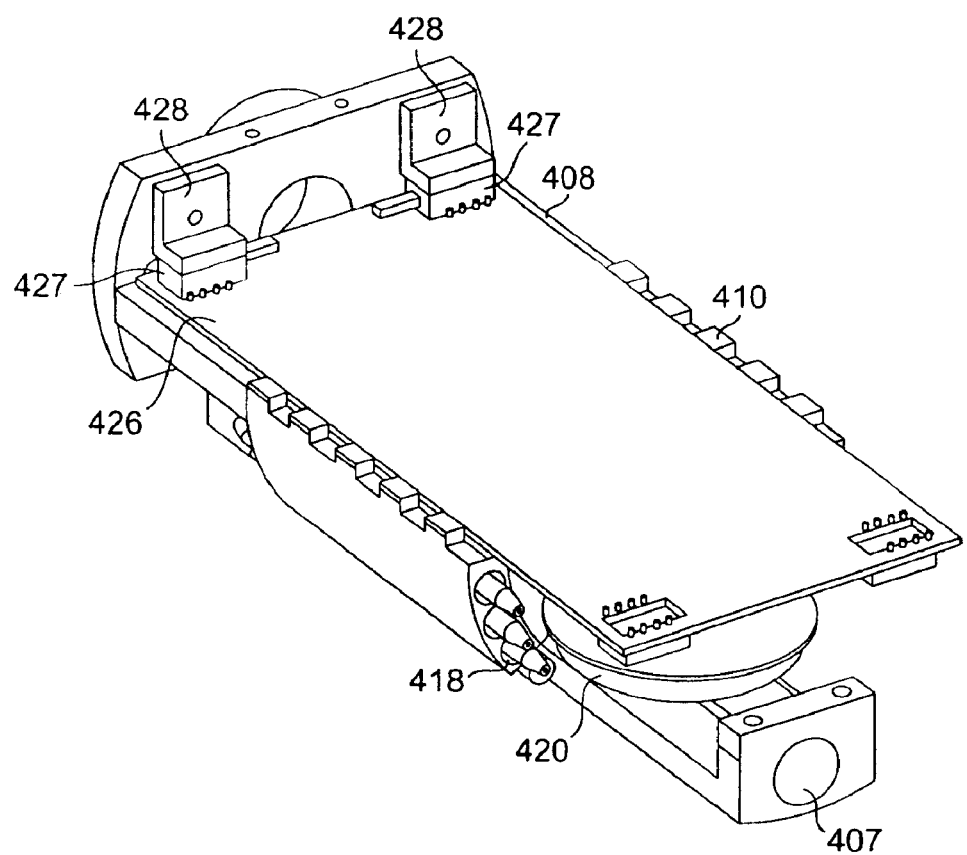

The present inventors have recognized that a cable joint such as the universal cable joints depicted in FIGS. 2–3 can be modified to serve as a repeater housing in which 1 or more optical amplifiers are located. FIGS. 4–6 show one embodiment of an optical amplifier module 400 that replaces the common component assembly 10 seen in FIGS. 1–4. The optical amplifier module 400 must have substantially the same dimensions as the common component assembly, which is only about 7.5 cm×15 cm. As previously mentioned, this is far less in size than conventional repeater housings, which are often several feet in length. The optical amplifier module 400 depicted in the figures can support 4 erbium-doped fiber amplifiers (EDFAs), physically grouped as a dual amplifier unit for each of two fiber pairs. Of course, the present invention encompasses optical amplifier modules that can support any number EDFAs.

Each optical amplifier includes an erbium doped fiber, an optical pump source, an isolator and a gain flattening filter (GFF). The amplifiers are single-stage, forward pumped with cross-coupled pump lasers. A 3 dB coupler allows both coils of erbium doped fiber in the dual amplifier to be pumped if one of the two pump lasers fails. At the output, an isolator protects against backward-scattered light entering the amplifier. The gain flattening filter is designed to flatten the amplifier gain at the designed input power. An additional optical path may be provided to allow a filtered portion of the backscattered light in either fiber to be coupled back into the opposite direction, allowing for COTDR-type line-monitoring. Of course, optical amplifier module 400 may support EDFAs having different configurations such as multistage amplifiers, forward and counter-pumped amplifiers, as well as fiber amplifiers that employ rare-earth elements other than erbium.

The optical amplifier module 400 is designed to be compatible with the remainder of the cable joint so that it connects to the cable termination units 12 and fits within the stainless steel sleeve 14 in the same manner as the common component assembly 10.

A perspective view of optical amplifier module 400 is shown in FIG. 4. The module 400 is defined by a generally cylindrical structure having flanges 402 located on opposing end faces 403. Flanges 402 mate with the cable termination units 12 of the Universal Joint shown in FIG. 3. Through-holes 407 extend inward from the end faces 403 through which the tension rod of the universal joint are inserted. The end faces 403 also include clearance holes 430 for securing the end caps 13 of the Universal Joint to the optical amplifier module 400. The clearance holes 430 are situated along a line perpendicular to the line connecting the tension rods thru-holes 407.

A longitudinal plane 405 extends through the optical amplifier module 400 to thereby bisect the module 400 into two half units $404_1$ and $404_2$ that are symmetric about a rotational axis perpendicular to the longitudinal plane 405. That is, rather than dividing the end faces 403 into two portions located on different half units 404, each half unit 404 includes the portion of one of the end faces 403 on which a respective flange 402 is located. FIG. 5 shows a perspective view of one of the units 404. In the embodiment of the invention depicted in FIGS. 4–6, each half unit 404 houses two erbium-doped fiber amplifiers.

As shown in FIG. 5, each unit 404 includes curved sidewalls 412 forming a half cylinder that defines a portion of the cylindrical structure. A spinal member 406 is integral with and tangent to the curved sidewalls 412 and extends longitudinally therefrom. The thru hole 407 containing the tension rod of the universal joint extends through the spinal member 406. A mating surface 408 extends along the periphery of the unit 404 in the longitudinal plane 405. When the optical amplifier module 400 is assembled, the mating surface 408 of unit $404_1$ contacts the mating surface 408 of its corresponding unit $404_2$. Interlocking teeth 410 are located on the mating surface 408 for properly aligning the two units with one another. A circuit board support lip 416 is located radially inward from the mating surface 408. The support lip 416 is recessed with respect to the mating surface 408 so that when the circuit board is placed on the support lip 416 (see FIG. 6) the circuit board forms a continuous plane with the mating surface 408. The inner cavity of the unit 404 located between the circuit board support lip 416 and the spinal member 406 serves as an optical fiber storage area. Optical fiber spools 420 are located on the inner surface of the spinal member 406 in the optical fiber storage area. The erbium doped fibers, as well as any excess fiber, are spooled around the optical fiber spools 420. The optical fiber spools 420 have outer diameters that are at least great enough to prevent the fibers from bending beyond their minimum specified bending radius.

The curved sidewalls 412 are sufficiently thick to support a plurality of thru-holes 418 that extend therethrough in the longitudinal direction. The thru-holes 418 serve as receptacles for the passive components of the optical amplifiers. That is, each receptacle 418 can contain a component such as an isolator, gain flattening filter, coupler and the like. Tapped holes 422 are provided in the inner surface of the sidewalls 412 through which screws are inserted to frictionally secure the passive components in their respective receptacles 418.

A pair of pump support members 424 are situated on the side of the support lip 416 adjacent to the end face 403. The support members 424 are located on opposing sides of the flange 402. As best seen in FIG. 6, the circuit board 426 has cut-outs so that the board 426 fits over the support members 422 when it is placed on the support lip 416. After the circuit board 426 is in place, a pump source 427 that provide the pump energy for each optical amplifier is mounted on the support member 422. A heat sink 428 secured to the end face 403 contacts each pump source to conduct away heat generated by the pump source 427.

In some circumstances it may be desirable to employ a concatenation of two or more of the optical amplifier modules depicted in FIGS. 4–6. That is, two or more optical amplifier modules (each inserted in their respective stainless steel sleeves and connected to their respective cable termination units to form a repeater housing) can be used along the same cable. Since, as previously mentioned, the optical amplifier module depicted above is configured to support two amplifier pairs, if more amplifier pairs are required, they may be placed in additional modules. For example, if two repeater housings are concatenated on the same cable, four amplifier pairs can be provided. More generally, a concatenation of N optical amplifier modules can support 2N amplifier pairs.

A concatenation of two or more repeater housings can also be used to redistribute the amplifier components among the housings in a variety of different ways. For example, if two such housings are employed, one can be used to support all the optical components and the other could be used to support the electronic components. In this way the various functional elements of the repeater can be distributed in different housings. If three optical amplifier modules are employed, the optical components, the power converter circuitry, and the pump controllers, may each be located in different housings. Of course, the amplifier components may be distributed among the housings in a wide variety of other permutations as well.

Figure 7:
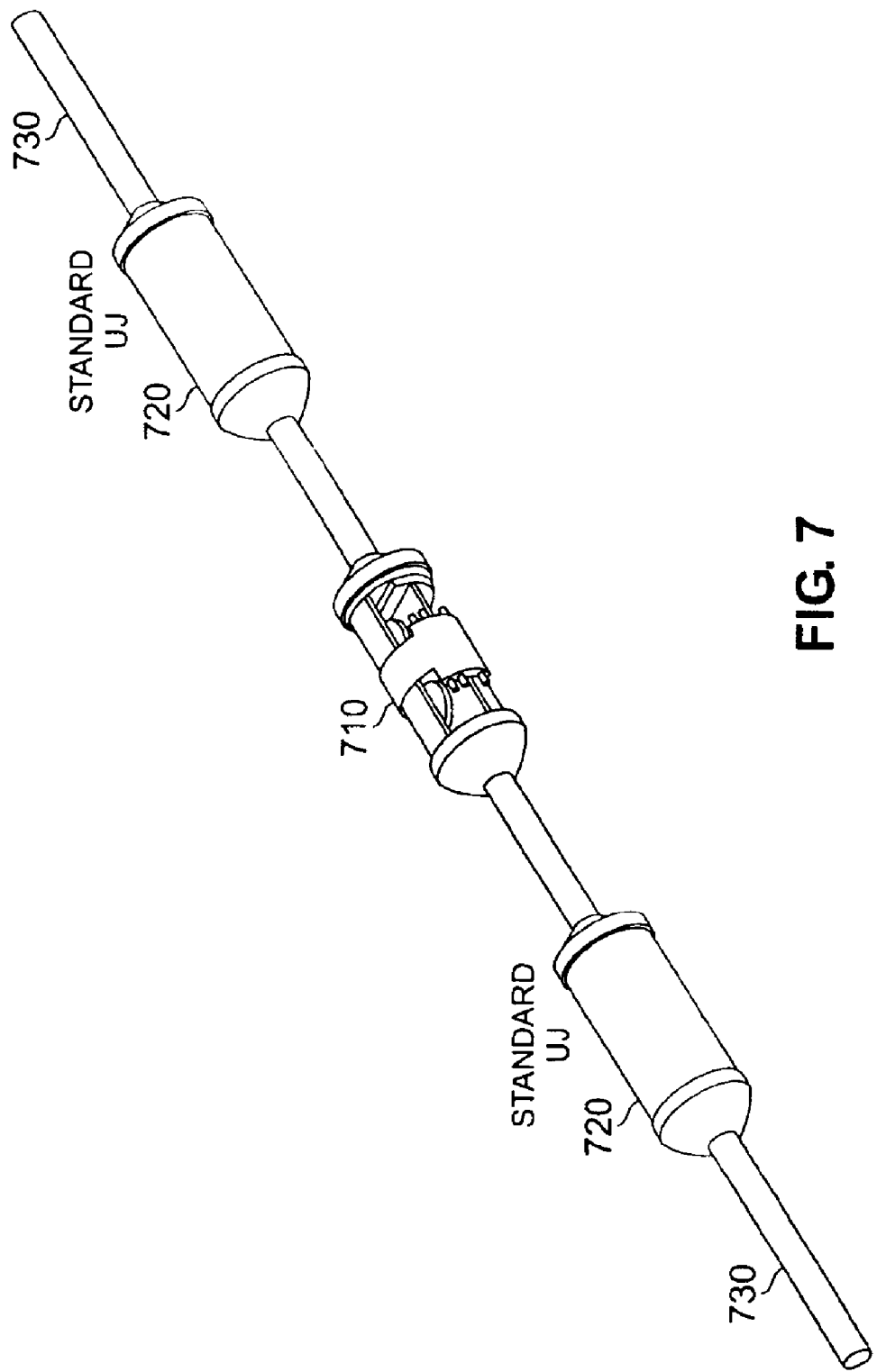
FIG. 7 shows an embodiment of the invention in which an optical amplifier module is concatenated with two universal cable joints.

In some cases it may be desirable to concatenate the optical amplifier module with two conventional cable joints (e.g., the Universal Joint shown in FIG. 3) in the manner shown in FIG. 7. As shown, the repeater housing 710 (in which is situated an optical amplifier module) is located along a cable between the conventional cable joints 720 to provide an integrated unit. That is, the repeater housing 710, cable segments, and cable joints 720 are operationally coupled to one another so that they can all be traversed by an optical signal. A number of advantages arise by providing such an integrated unit to a customer. For example, the customer does not need to open the repeater housing 710 to splice it to the cables since the cables will be already spliced to the conventional cable joints 720, thus reducing the possibility of damage to the relatively fragile repeater components as a result of the customer opening the housing. Moreover, if, as in FIG. 7, cable pigtails 730 terminate in the ends of the conventional cable joints 720 remote from the repeater housing 710, the integrated unit will effectively appear to the customer as a segment of cable to which it can employ any splicing and coupling technique that is desired to achieve mechanical, electrical, and optical connections.

What is claimed is:

1. An optical transmission cable interconnect for insertion in an undersea optical transmission cable, said interconnect comprising:
    a plurality of modules, each of said modules including:
        an internal housing having an outer dimension substantially equal to an outer dimension of an internal fiber splice housing of an undersea optical fiber cable joint, said internal housing including:
        a pair of opposing end faces each having a retaining element for retaining the internal housing within an outer housing of said undersea optical fiber cable joint, said retaining element including an aperture through which at least one optical fiber extending from an end portion of the optical transmission cable extends into the internal housing;
        a sidewall interconnecting said opposing end faces and extending between said opposing end faces in a longitudinal direction, said sidewall including a receptacle portion having a plurality of thru-holes each being sized to receive a passive optical component employed in an optical amplifier; and
        a first segment of undersea optical transmission cable operationally coupling a first end face of a first of the modules to a second end face of a second of the modules.

2. The interconnect of claim 1 further comprising a plurality of undersea optical transmission cable pigtails operationally coupled to a second end face of the first module and a first end face of the second module, respectively.

3. The interconnect of claim 1 wherein at least one of said modules contains at least one optical amplifier.

4. The interconnect of claim 1 wherein each of said modules contains at least one optical amplifier.

5. The interconnect of claim 1 wherein the first of the modules contains optical components of at least one optical amplifier and a second of the modules contains electronic components of the at least one optical amplifier.

6. The interconnect of claim 1 wherein the first of the modules contains a subset of components required of at least one optical amplifier and a second of the modules contains remaining components of the at least one optical amplifier.

7. The interconnect of claim 1 further comprising:
    a plurality of undersea optical fiber cable joints;
    a plurality of undersea optical transmission cable pigtails operationally coupling a first of the cable joints to a second end face of the first module and a second of the cable joints to a first end face of the second module, respectively.

8. The interconnect of claim 1 wherein said plurality of thru-holes laterally extend through said receptacle portion of the sidewall in the longitudinal direction.

9. The interconnect of claim 1 wherein said internal housing has a generally cylindrical shape, said receptacle portion of the sidewall having a curvature that defines a diameter of the cylindrical shape.

10. The interconnect of claim 1 wherein the undersea optical fiber cable joint is a universal joint for jointing optical cables having different configurations.

11. The interconnect of claim 1 wherein said universal joint includes a pair of cable termination units in which end portion of the optical cables to be jointed are respectively retained, said retaining elements each being connectable to one of the cable termination units.

12. The interconnect of claim 1 further comprising an optical fiber storage area located within said internal housing.

13. The interconnect of claim 1 further comprising a support member for supporting at least one circuit board on which reside electronics associated with the optical amplifier.

14. The interconnect of claim 1 wherein said optical fiber storage area includes at least one optical fiber spool around which optical fiber can be wound.

15. The interconnect of claim 1 wherein said internal housing is formed from a pair of half units each having a mating surface extending in a longitudinal plane that includes the longitudinal direction, said half units being interconnected to one another along said mating surfaces.

16. The interconnect of claim 13 wherein said support member supporting the circuit board is arranged so that the circuit board and the mating surface form a substantially continuous plane.

17. The interconnect of claim 13 wherein said support member is defined by a lip extending inwardly from, and recessed below, said mating surface.

18. The interconnect of claim 1 wherein said sidewall includes a pair of ribbed members extending longitudinally from the receptacle portion of the sidewall, said ribbed members each having a tension rod thru-hole extending laterally therethrough in the longitudinal direction for supporting a tension rod employed by the undersea optical fiber cable joint.

19. The interconnect of claim 1 wherein the outer dimension of the internal housing is less than about 15 cm×50 cm.

20. The interconnect of claim 1 wherein the outer dimension of the internal housing is about 7.5 cm×15 cm.

21. An optical transmission cable interconnect for insertion in an undersea optical transmission cable, said interconnect comprising:

a plurality of undersea optical fiber cable joints;

an optical amplifier module that includes:

an internal housing having an outer dimension substantially equal to an outer dimension of an internal fiber splice housing of an undersea optical fiber cable joint, said internal housing including:

a pair of opposing end faces each having a retaining element for retaining the internal housing within an outer housing of said undersea optical fiber cable joint, said retaining element including an aperture through which at least one optical fiber extending from the end portion of one of the optical cables extends into the internal housing;

a sidewall interconnecting said opposing end faces and extending between said opposing end faces in a longitudinal direction, said sidewall including a receptacle portion having a plurality of thru-holes each being sized to receive a passive optical component employed in an optical amplifier; and a plurality of segments of undersea optical transmission cable, a first of said segments operationally coupling a first end face of a first of the cable joints to a first end face of the optical amplifier module and a second of said segments operationally coupling a first end face of a second of the cable joints to a second end face of the optical amplifier module.

22. The interconnect of claim 21 further comprising a plurality of undersea optical transmission cable pigtails operationally coupled to a second end face of the first cable joint and a second end face of the second cable joint, respectively.

23. The interconnect of claim 21 wherein said plurality of thru-holes laterally extend through said receptacle portion of the sidewall in the longitudinal direction.

24. The interconnect of claim 21 wherein said internal housing has a generally cylindrical shape, said receptacle portion of the sidewall having a curvature that defines a diameter of the cylindrical shape.

25. The interconnect of claim 21 wherein the undersea optical fiber cable joint is a universal joint for jointing optical cables having different configurations.

26. The interconnect of claim 21 wherein said universal joint includes a pair of cable termination units in which end portion of the optical cables to be jointed are respectively retained, said retaining elements each being connectable to one of the cable termination units.

27. The interconnect of claim 21 further comprising an optical fiber storage area located within said internal housing.

28. The interconnect of claim 21 further comprising a support member for supporting at least one circuit board on which reside electronics associated with the optical amplifier.

29. The interconnect of claim 21 wherein said optical fiber storage area includes at least one optical fiber spool around which optical fiber can be wound.

30. The interconnect of claim 21 wherein said internal housing is formed from a pair of half units each having a mating surface extending in a longitudinal plane that includes the longitudinal direction, said half units being interconnected to one another along said mating surfaces.

31. The interconnect of claim 28 wherein said support member supporting the circuit board is arranged so that the circuit board and the mating surface form a substantially continuous plane.

32. The interconnect of claim 28 wherein said support member is defined by a lip extending inwardly from, and recessed below, said mating surface.

33. The interconnect of claim 21 wherein said sidewall includes a pair of ribbed members extending longitudinally from the receptacle portion of the sidewall, said ribbed members each having a tension rod thru-hole extending laterally therethrough in the longitudinal direction for supporting a tension rod employed by the undersea optical fiber cable joint.

34. The interconnect of claim 21 wherein the outer dimension of the internal housing is less than about 15 cm×50 cm.

35. The interconnect of claim 21 wherein the outer dimension of the internal housing is about 7.5 cm×15 cm.

* * * * *

UNITED STATES PATENT AND TRADEMARK OFFICE
CERTIFICATE OF CORRECTION

PATENT NO. : 6,870,993 B2
DATED : March 22, 2005
INVENTOR(S) : Mark K. Young et al.

It is certified that error appears in the above-identified patent and that said Letters Patent is hereby corrected as shown below:

Column 1,
Line 50, before "equi-axial", delete -- The --, and change "non" to -- Non --.

Column 3,
Line 45, before "optical amplifier" insert -- an --.

Column 5,
Line 23, change "seen in FIGS. 14" to -- seen in FIGS. 1-4 --.

Column 6,
Line 55, change "that provide" to -- that provides --.

Column 8,
Lines 35 and 36, change "in which end portion" to -- in which end portions --.
Line 44, before "electronics," change "reside" to -- resides --.

Column 10,
Lines 5 and 6, change "in which end portion" to -- in which end portions --.
Line 14, before "electronics," change "reside" to -- resides --.

Signed and Sealed this

Ninth Day of August, 2005

JON W. DUDAS
*Director of the United States Patent and Trademark Office*